US009075682B2

(12) United States Patent
Christudass et al.

(10) Patent No.: US 9,075,682 B2
(45) Date of Patent: Jul. 7, 2015

(54) STB-DRIVEN UPGRADE OF REMOTE SERVER APPLICATION

(75) Inventors: John J. Christudass, Coppell, TX (US); Abhilash Paul, Irving, TX (US); Sunil D. Limbasia, Irving, TX (US); Srinivas Tatavarty, Irving, TX (US); Aravind Perumandla, Lewisville, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 25 days.

(21) Appl. No.: 13/612,979

(22) Filed: Sep. 13, 2012

(65) Prior Publication Data

US 2014/0075467 A1 Mar. 13, 2014

(51) Int. Cl.
*G06F 3/00* (2006.01)
*G06F 13/00* (2006.01)
*H04N 5/445* (2011.01)
*G06F 9/44* (2006.01)
*G06F 9/445* (2006.01)
*H04N 21/458* (2011.01)
*H04N 21/488* (2011.01)

(52) U.S. Cl.
CPC .............. *G06F 8/65* (2013.01); *H04N 21/4586* (2013.01); *H04N 21/4882* (2013.01)

(58) Field of Classification Search
CPC ...... G06F 8/65; H04N 21/241; H04N 21/818; H04N 21/42692; H04N 21/4349; H04N 21/4586; H04N 21/8166; H04N 21/25858; H04N 21/4882; H04N 21/8402; H04L 41/082; H04L 67/34; H04L 12/2836
USPC ........................ 725/25–50, 106; 717/173, 168
See application file for complete search history.

(56) References Cited

U.S. PATENT DOCUMENTS

| | | | |
|---|---|---|---|
| 7,391,808 B1 * | 6/2008 | Farrand | 375/240.12 |
| 2005/0108757 A1 * | 5/2005 | Lee et al. | 725/50 |
| 2005/0168326 A1 * | 8/2005 | White et al. | 340/310.01 |
| 2007/0044156 A1 * | 2/2007 | Redmann | 726/25 |
| 2007/0112939 A1 * | 5/2007 | Wilson et al. | 709/219 |
| 2008/0134165 A1 * | 6/2008 | Anderson et al. | 717/173 |
| 2010/0070965 A1 * | 3/2010 | Britten et al. | 717/173 |
| 2010/0077390 A1 * | 3/2010 | Nicoulin et al. | 717/171 |
| 2010/0165957 A1 * | 7/2010 | Hegde et al. | 370/338 |
| 2011/0153405 A1 * | 6/2011 | Chen et al. | 705/14.34 |
| 2011/0258631 A1 * | 10/2011 | Ohashi | 718/102 |
| 2012/0204216 A1 * | 8/2012 | Connelly et al. | 725/106 |

* cited by examiner

*Primary Examiner* — Hai V Tran
*Assistant Examiner* — Jen-Shi Huang

(57) ABSTRACT

A client application, executed on a set-top box with a local network, detects that a media server application, executed on a computing device within the local network, is eligible for a software upgrade. The set-top box provides, based on the detecting, an interactive prompt, on a separate television display, to request authorization for the software upgrade. The set-top box receives user input, via a remote control, authorizing the software upgrade and provides, to the media server application on the computing device, a signal for the media server application to initiate the software upgrade.

19 Claims, 11 Drawing Sheets

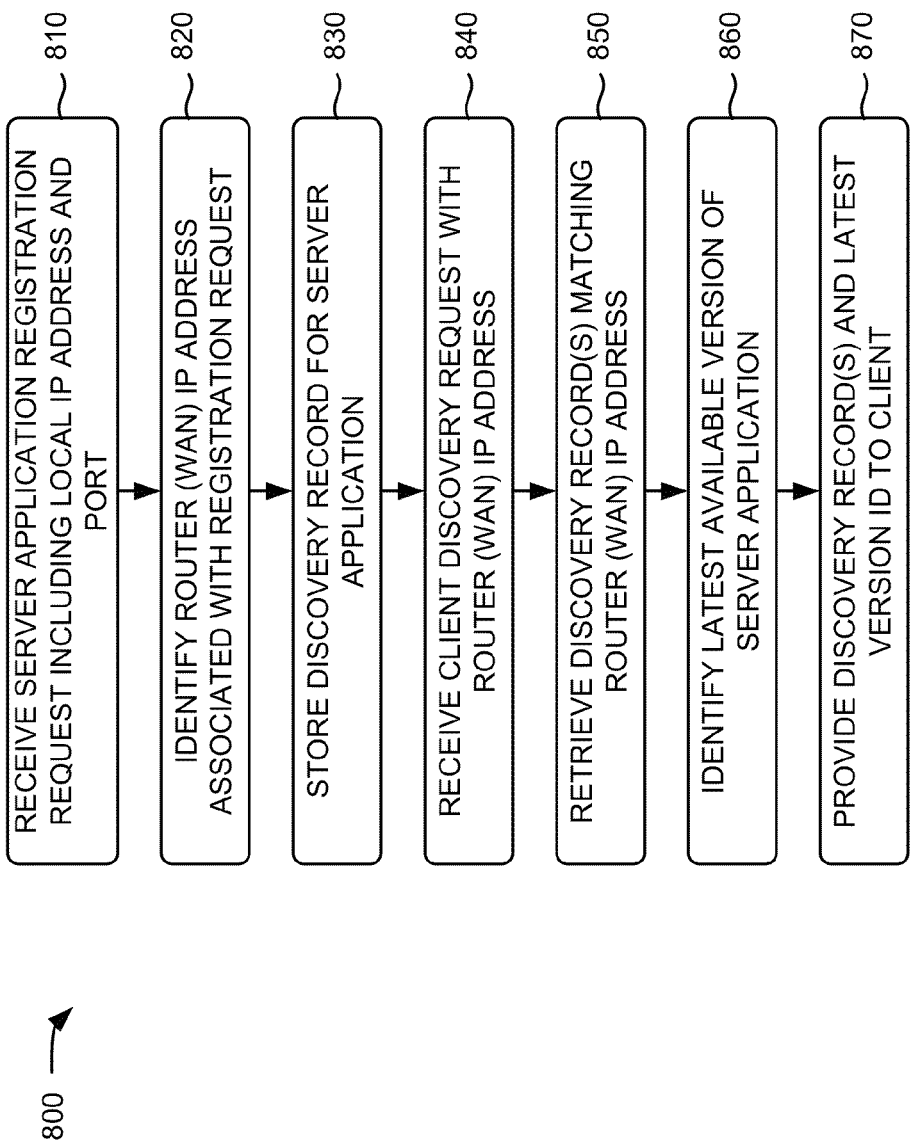

STB-DRIVEN UPGRADE OF REMOTE SERVER APPLICATION

BACKGROUND

Continued improvements to high speed networks have provided multiple avenues for consumers to access digital media. This increased access to content via multiple devices has driven a demand for device interoperability to enable consumers to easily view/share digital content on multiple devices. As one example, some network service providers offer media management services that allow customers to access digital media content from a local computer for presentation on a customer's television. For example, the media management services may allow a customer to access digital content, such as pictures, streaming media, home videos, etc., on a cable-ready television.

BRIEF DESCRIPTION OF THE DRAWINGS

FIG. 8 is a flow diagram of an exemplary process for assisting a STB with device discovery according to an implementation described herein.

DETAILED DESCRIPTION OF PREFERRED EMBODIMENTS

The following detailed description refers to the accompanying drawings. The same reference numbers in different drawings may identify the same or similar elements.

Figure 1:
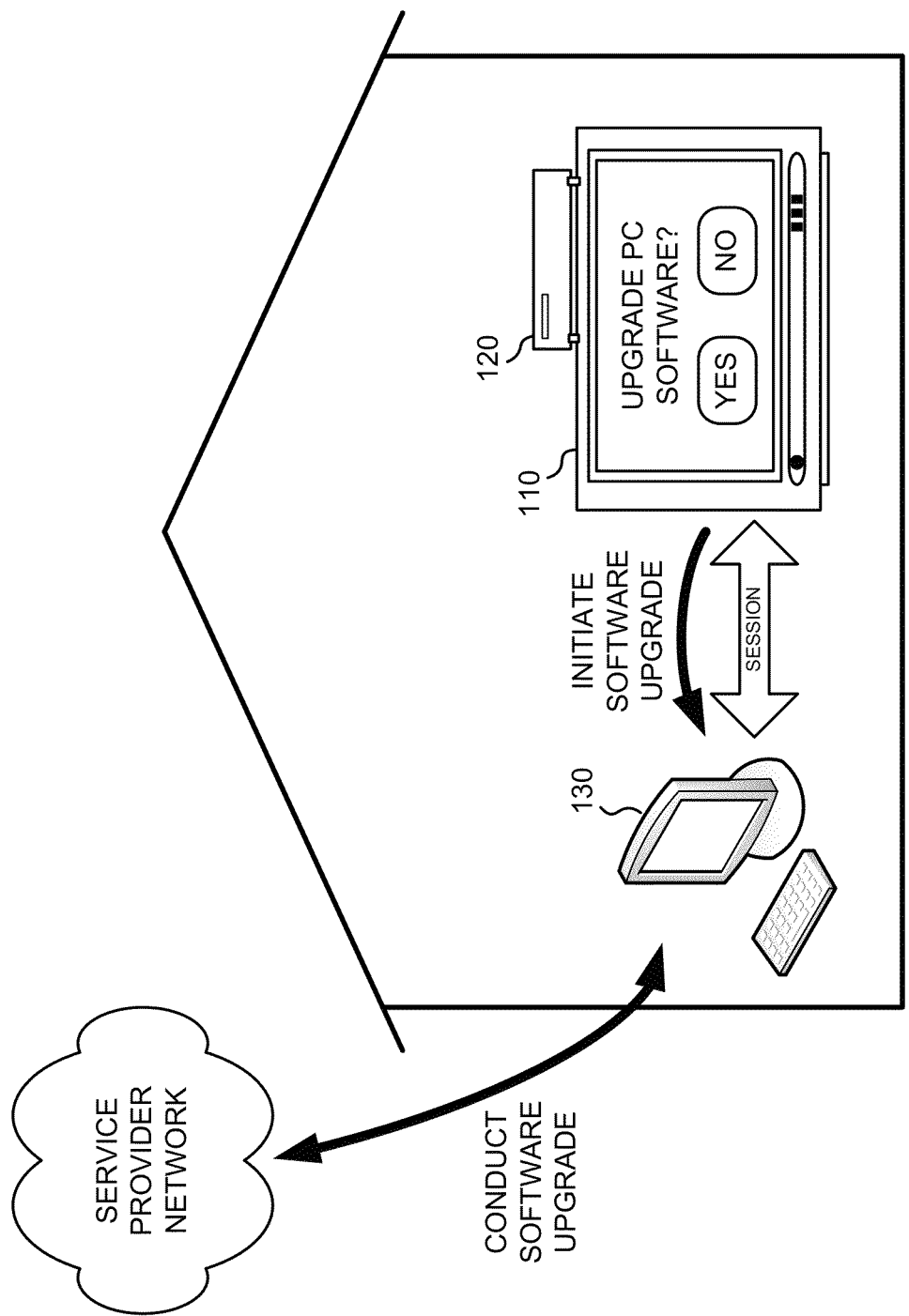
FIG. 1 is a diagram illustrating concepts described herein.

Systems and methods provided herein may enable a client application, residing on a set-top box (STB) within a home (or local) network, to initiate a software upgrade for a media manager server application residing on a computer within the same home network. FIG. 1 is a diagram illustrating concepts described herein. As shown in FIG. 1, a television display 110 may be connected to a set-top box (STB) 120 to provide broadcast and/or on-demand programming. A computing device 130 may also be configured to communicate with STB 120 (e.g., via a wired or wireless home network).

According to implementations described herein, computing device 130 may be equipped with a media server application and STB 120 may be equipped with a media client application that together enable STB 120 to retrieve and present, on television display 100, digital content from computing device 130. The client application on STB 120 may provide a user interface to enable a viewer to browse and retrieve digital content from computing device 130. Digital content may include, for example, content from a local memory of computing device 130 or streaming media from the Internet passed through computing device 130.

Improvements (e.g., software upgrades) to the client application on STB 120 and the server application on computing device 130 may occasionally be offered. As a closed system, upgrades to STB 120 may generally be managed and initiated via a service provider in a manner transparent to a user of STB 120. In contrast, upgrades to computing device 130 generally require user authorization and/or input. It would be desirable to have the client application on STB 120 and the server application on computing device 130 running the same (e.g., most recent) software versions. However, as a practical matter, a user viewing shared media on television display 110 may not be inclined to provide user input to authorize a software upgrade on computing device 130 (e.g., which may be in another room). Thus, an automatic upgrade to the client application on STB 120 may become unsynchronized with an older version of the server application on computing device 130. Systems and methods described herein promote synchronization of the client application on STB 120 and the server application on computing device 130 by enabling a user of STB 120 to remotely initiate a software upgrade of the server application on computing device 130.

Figure 2:
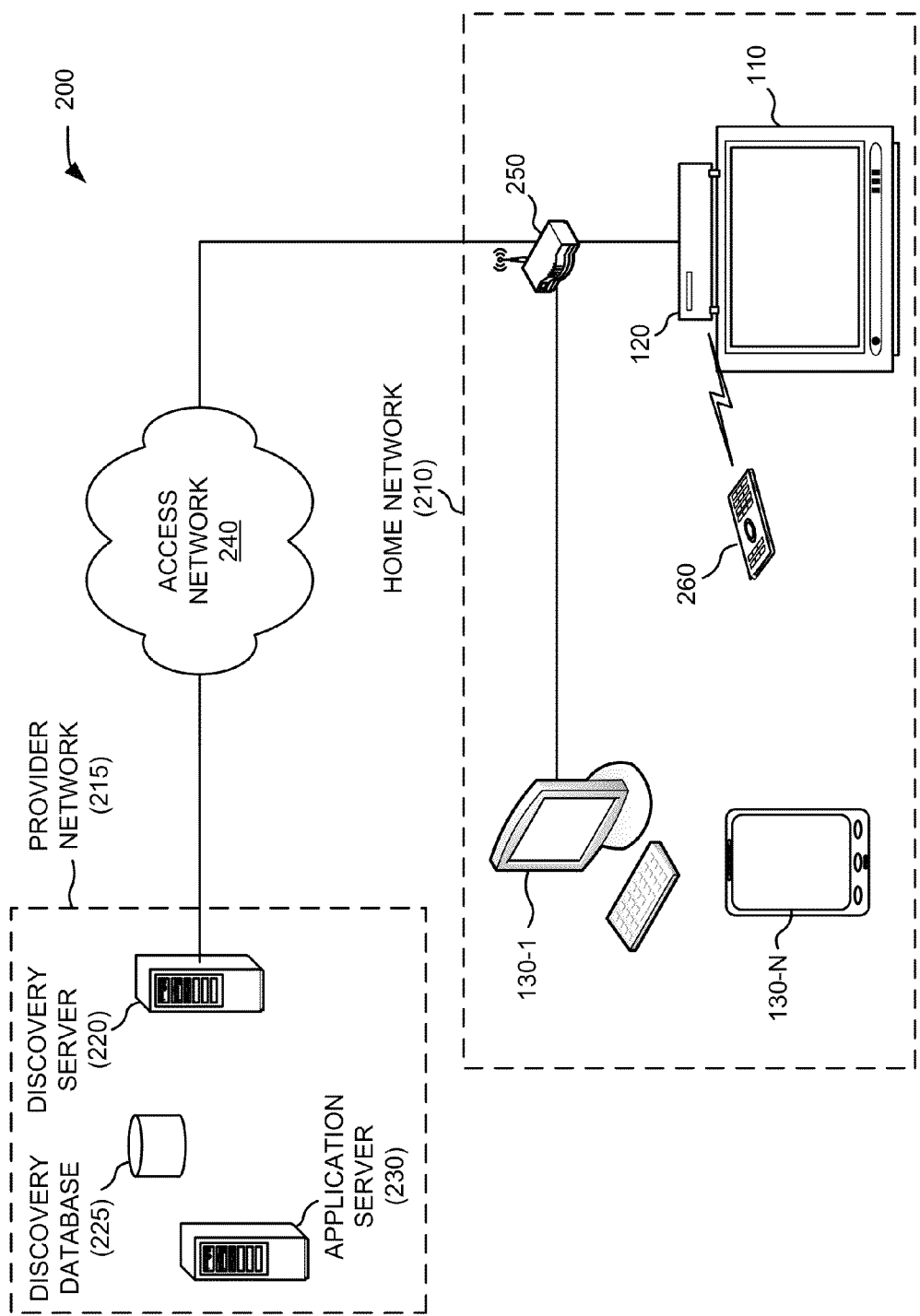
FIG. 2 is a diagram illustrating an exemplary network in which systems and/or methods described herein may be implemented.

FIG. 2 is a diagram illustrating an exemplary network 200 in which systems and/or methods described herein may be implemented. As illustrated, network 200 may include a home network 210, a provider network 215, and an access network 240. Home network 210 may include television display 110, STB 120, computing devices 130-1 through 130-N (collectively "computing devices 130" and individually "computing device 130"), a home router 250, and a remote control 260. Provider network 215 may include a discovery server 220, a discovery database 225, and an application server 230. Components of network 200 may be connected via wired and/or wireless links.

Home network 210 may include one or more devices connected to each other, and/or to access network 240. Devices in home network 210 may include, for example, one or more set-top boxes (e.g., STB 120), local routers (e.g., home router 250), televisions (e.g., television display 110), personal computers (e.g., computing devices 130), and/or mobile devices (e.g., computing devices 130). Home network 210 may also include other networking equipment and/or devices, such as additional media storage devices or routers, cables, splitters, etc. (not shown). In one implementation, home network 210 may support wireless communications (e.g., using IEEE 802.11 standards).

Television display 110 may include any device capable of receiving and reproducing video signals. In one implementation, television display 110 may include a television. In another implementation, television display 110 may include, for example, a display of a stationary communication device (e.g., a computer monitor or a telephone), or a display of a portable communication device (e.g., a mobile telephone or a PDA).

STB 120 may include a device for selecting, obtaining (e.g., from provider network 215), and/or recording content that may be shown or played on video display device 110 or another device. Examples of STB 120 may include a media client, a set-top box, a computer, a cable card, and a portable electronic device. STB 120 may allow a user to alter programming provided to television display 110 (e.g., a channel up or channel down signal) or provide input for interactive menus (e.g., to navigate menu displays or input data) based on a signal from remote control 260. For example, STB 120 may support interactive interfaces using Enhanced TV Binary Interchange Format (EBIF) or another interactive television format. STB 120 may receive a television (or other programming) signal from a backend server (not shown), may convert the signal to a form usable by television display 110, and may transmit the signal to television display 110 for display. In one implementation, STB 120 may be a closed device (e.g., including a hardware/software configuration that is not accessible to the general public) that restricts unauthorized alteration of programming delivered over access network 240.

In one implementation, STB 120 may include a device (e.g., an Internet Protocol (IP)-based device) configured to execute a client application that is capable of communicating with another device (e.g., computing device 130) within a customer premises network (e.g., home network 210) or another device (e.g., discovery server 220) outside the customer premises network (e.g., via access network 240). For example, STB 120 may communicate with discovery server 220 to request discovery information for local devices in home network 210 and may communicate with computing device 130 to initiate media transfers from computing device 130 to STB 120.

Computing device 130 may include a computational or communication device. Computing device 130 may enable a user to send/receive messages, view content, and/or interact with other devices. For example, computing device 130 may include a personal computer (e.g., a laptop or desktop PC), a tablet computer, a smart phone, a gaming system, a personal media player, or other types of computational or communication devices that can communicate with STB 120 and discovery server 220. In one implementation, computing device 130 may include a media server application that automatically provides computing device discovery information (e.g., a local IP address and active port) to discovery server 220 for future use by a corresponding client application (e.g., residing on STB 120) in home network 210. Computing device 130 (e.g., via the server application) may also enable media transfer from computing device 130 to STB 120 for presentation on television display 110. In implementations described further herein, computing device 130 may receive signals from STB 120 (e.g., via a TCP/IP session) to initiate and authorize a software upgrade and may communicate with application server 230 to receive the upgrade.

Home router 250, also referred to as a broadband home router (BHR) or home network gateway (HNG), may act as a hub for communications entering home network 210. For example, discovery server 220 may communicate with one or more devices in a customer's home (e.g., STB 120 or computing devices 130) via access network 240 and home router 250. Similarly, home router 250 may forward communications from devices in a customer's home (e.g., STB 120 or computing devices 130) to discovery server 220 via access network 240. In some implementations, home router 250 may communicate with devices in home network 210 and facilitate communications between devices in home network 210.

Remote control 260 may include a device that allows a user to control programming and/or content displayed on one or more of television displays 110 via interaction with STB 120. Remote control 260 may transmit signals, such as, for example, infrared signals, to a signal receiver associated with television display 110 and/or STB 120. In one implementation, remote control 260 may be used to activate and navigate within a client application that enables media transfers from computing device 130 to STB 120.

Provider network 215 may include network devices that provide backend services to devices in home network 210, including services to enable media transfer from computing device 130 to STB 120. Provider network 215 may include, for example, one or more private IP networks that use a private IP address space. Provider network 215 may include a local area network (LAN), an intranet, a private wide area network (WAN), etc. In one implementation, provider network 215 may implement one or more Virtual Private Networks (VPNs) for providing communication between devices within provider network 215. Provider network 215 may be protected/separated from other networks, such as network 240, by a firewall. Although shown as a single element in FIG. 2, provider network 215 may include a number of separate networks.

Discovery server 220 may include a network device that receives discovery information from computing devices 130 and distributes discovery records to STB 120. For example, discovery server 220 may receive discovery information from computing device 130 and/or home router 250 and may format a discovery record for storage in discovery database 225. Discovery server 220 may also receive requests (e.g., from STB 120) for discovery records and provide appropriate discovery records to STB 120.

Discovery database 225 may include a database or another data structure to store discovery records and associated metadata that may be used (e.g., by discovery server 220) to respond to requests from STB 120.

Application server 230 may include a network device to provide a backend support system for media sharing applications residing on STB 120 and computing device 130. For example, application server 230 may permit computing device 130 to download a server application to enable media transfers to a corresponding client application on STB 120. In one implementation, application server 230 may also provide software upgrades for both the client application on STB 120 and the server application on computing device 130.

Access network 240 may include a video signaling and distribution network and system that permits transfer of data between home network 210 and provider network 215. Additionally, access network 240 may include, among other things, a firewall, a filtering mechanism, a proxy, and/or network address translation mechanisms. Access network 240 may include, for example, a single network, such as a wide area network (WAN), a local area network (LAN), a metropolitan area network (MAN), a telephone network (e.g., a public switched telephone network (PSTN) or a wireless network), the Internet, a satellite network, etc., or a combination of networks. Access network 240 may provide customers with multimedia content provided, for example, by devices in provider network 215. Although shown as a single element in FIG. 2, access network 240 may include a number of separate networks that function to provide services to devices in home network 210.

In FIG. 2, the particular arrangement and number of components of network 200 are illustrated for simplicity. In practice there may be more home networks 210, provider networks 215, access networks 240, and/or devices within those networks. For example, there may be hundreds or thousands of home networks 210.

Figure 3:
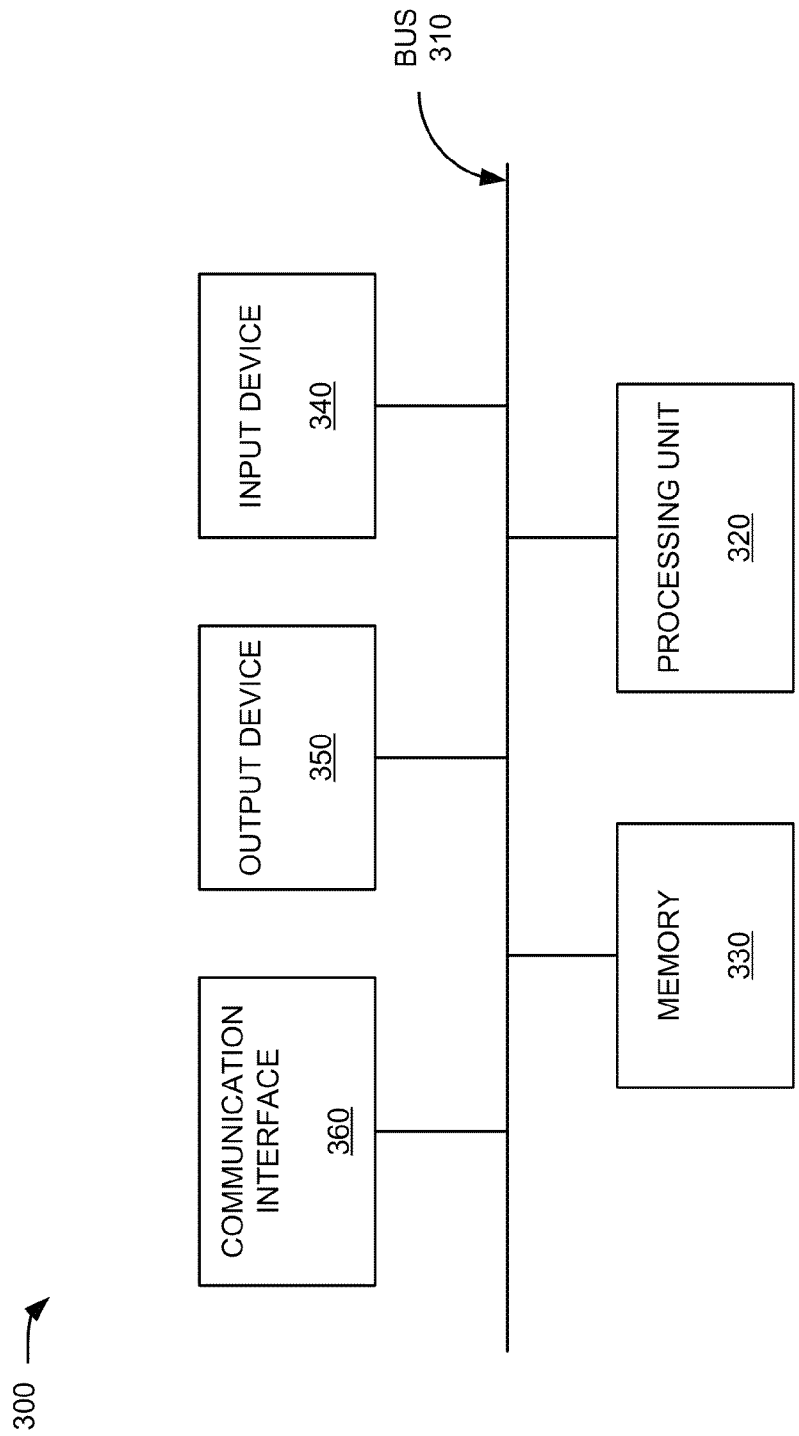
FIG. 3 is a block diagram illustrating exemplary components of a device that may correspond to one of the devices of FIG. 2.

FIG. 3 is a diagram of exemplary components of a device 300. Each of STB 120, computing device 130, discovery server 220, and application server 230 may be implemented/installed as a combination of hardware and software on one or more of device 300. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits a user to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of network 200.

As described herein, device 300 may perform certain operations in response to processing unit 320 executing software instructions contained in a computer-readable medium, such as memory 330. A computer-readable medium may include a non-transitory memory device. A memory device may be implemented within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently-arranged components, or additional components than those depicted in FIG. 3. As an example, in some implementations, a display may not be included in device 300. In these situations, device 300 may be a "headless" device that does not include input device 340. Alternatively, or additionally, one or more components of device 300 may perform one or more other tasks described as being performed by one or more other components of device 300.

Figure 4:
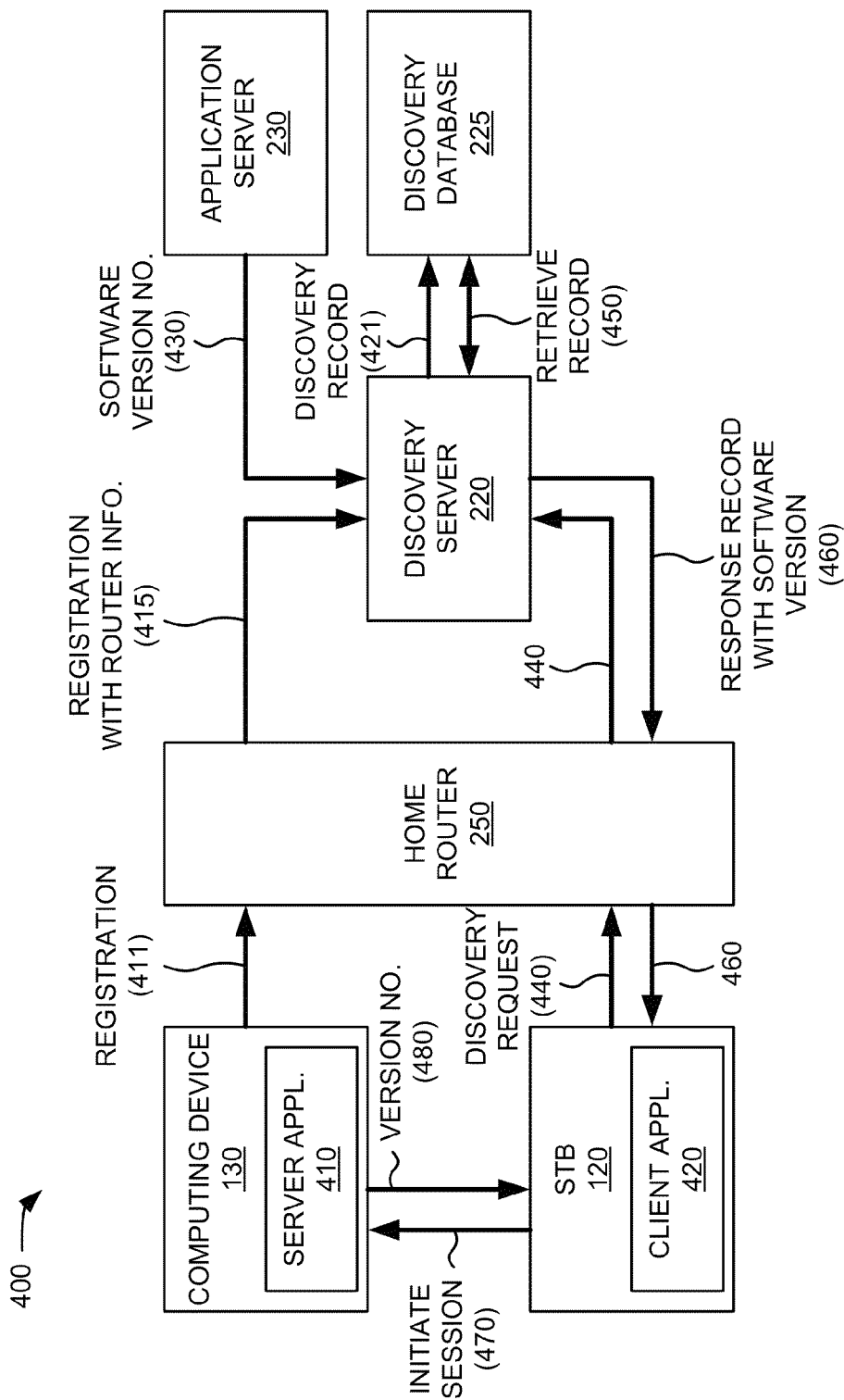
FIG. 4 is a block diagram illustrating exemplary communications between devices in a portion of the network of FIG. 2.

FIG. 4 is a diagram of exemplary communications for a portion 400 of network 200. Communications in FIG. 4 may represent communications to provide device discovery services for media manager applications residing on STB 120. More particularly, the device discovery services may enable STB 120 to detect when software upgrades are necessary/available for a server application residing on computing device 130. Communications in FIG. 4 may be used, for example, when STB 120 or computing server 130 is not compliant with Digital Living Network Alliance (DLNA) standards for enabling device discovery. As shown in FIG. 4, network portion 400 may include STB 120, computing device 130, discovery server 220, discovery database 225, application server 230, and home router 250. STB 120, computing device 130, discovery server 220, discovery database 225, application server 230, and home router 250 may include functionality described above in connection with, for example, FIGS. 1-3.

As shown in FIG. 4, computing device 130 may include a server application 410. Server application 410 may be obtained, for example, via a download procedure from discovery server 220 or another device in provider network 215. Server application 410 may enable media transfer from computing device 130 to STB 120 (e.g., for presentation on television display 110). Upon installation/activation, server application 410 may cause computing device 130 to send a registration request 411 to discovery server 220 (via home router 250). Registration request 411 may include a local IP address identifying where server application 410 is running and a port on which server application 410 is listening. In one implementation, the communications between computing device 130 and discovery server 220 may be performed using hypertext transfer protocol (HTTP) or secure HTTP (HTTPS). In another implementation, the communications between computing device 130 and discovery server 220 may be performed using another type of protocol.

In accordance with routing protocols, home router 250 may add header information or other indicators that will enable discovery server 220 to identify the IP address of home router 250 (e.g., the WAN address) for user over access network 240. Home router 250 may forward registration request 411 with router information, as indicated by reference number 415.

Discovery server 220 may receive registration request 411 with router information 415 and create a discovery record 421 with the router (WAN) IP address, the local IP address, and the port for server application 410. Discovery server 220 may store discovery record 421 in discovery database 225 for later use. Discovery server 220 may also receive, from application server 430, a software version number 430 (or other identifier) that indicates the latest software version of server application 410. Application server 230 may provide software version number 430, for example, whenever an upgrade is released. In one implementation, software version number 430 may include multiple version indicators relating to, for example, different operating systems that may be used on computing devices 130. Discovery server 220 may store software version number 430 locally or in a separate database (e.g., discovery database 225).

STB 120 may include a client application 420 to communicate with server application 410 and to enable media transfer from computing device 130 to STB 120 for presentation on television display 110. Client application 420 may be downloaded, for example, from application server 230 or another provisioning server (not shown) associated with a service provider network 215. Upon activation of client application 420 by a user (e.g., a user selecting a "media sharing" option from a menu via remote control 260), client application 420 may cause STB 120 to generate a discovery request 440.

Discovery request 440 may request discovery records for server application(s) 410 registered behind home router 250. STB 120 may forward discovery request 440 via home router 250 to discovery server 220. The sending of discovery request 440 (and receipt of a subsequent response from discovery server 220) may be transparent to the user. In one implementation, discovery request 440 may be provided using IP communications. In another implementation, discovery request 440 may be provided via another communication protocol, including in-band or out-of-band communications. In one implementation, according to routing protocols, home router 250 may add header information or other indicators that will enable discovery server 220 to identify the IP address of home router 250 for user over access network 240.

Discovery server 220 may receive discovery request 440 and may query discovery database 225 for discovery record(s) 420 that match the router (WAN) IP address of home router 250. Assuming computing device 130/server application 410 has submitted registration request 411 and that discovery record 421 has been created, discovery server 220 may identify a record with a matching router (WAN) IP address in discovery database 225 and retrieve the corresponding record, as indicted by reference number 450. Discovery server 220 may also retrieve software version number 430. Discovery server 220 may forward the retrieved record with the software version number, as response record 460, to client application 420.

Client application 420 may receive response record 460 and may store the information in response record for immediate and/or subsequent communications with computing device 130/server application 410. For example, client application 420 may use the local IP address and port information from response record 460 to initiate a session (e.g., a TCP/IP session) with computing device 130/server application 410, as indicated by reference number 470, to conduct media sharing between computing device 130 and STB 120. Client application 420 may then solicit from server application 410 a current version number (or other version identifier) for server application 410 as it currently resides on computing device 130. Computing device 130/server application 410 may provide the current version number 480 to client application 420.

According to implementations described herein, client application 420 may compare version number 480 to the software version number in response record 460 to determine if computing device 130 is eligible to receive a software upgrade for server application 410. For example, if version number 480 is lower than the software version number in response record 460, client application may determine that server application 410 should be upgraded.

Although FIG. 4 shows exemplary components of network portion 400, in other implementations, network portion 400 may include fewer components, different components, differently-arranged components, and/or additional components than depicted in FIG. 4. Alternatively, or additionally, one or more components of network portion 400 may perform one or more other tasks described as being performed by one or more other components of network portion 400.

Figure 5:
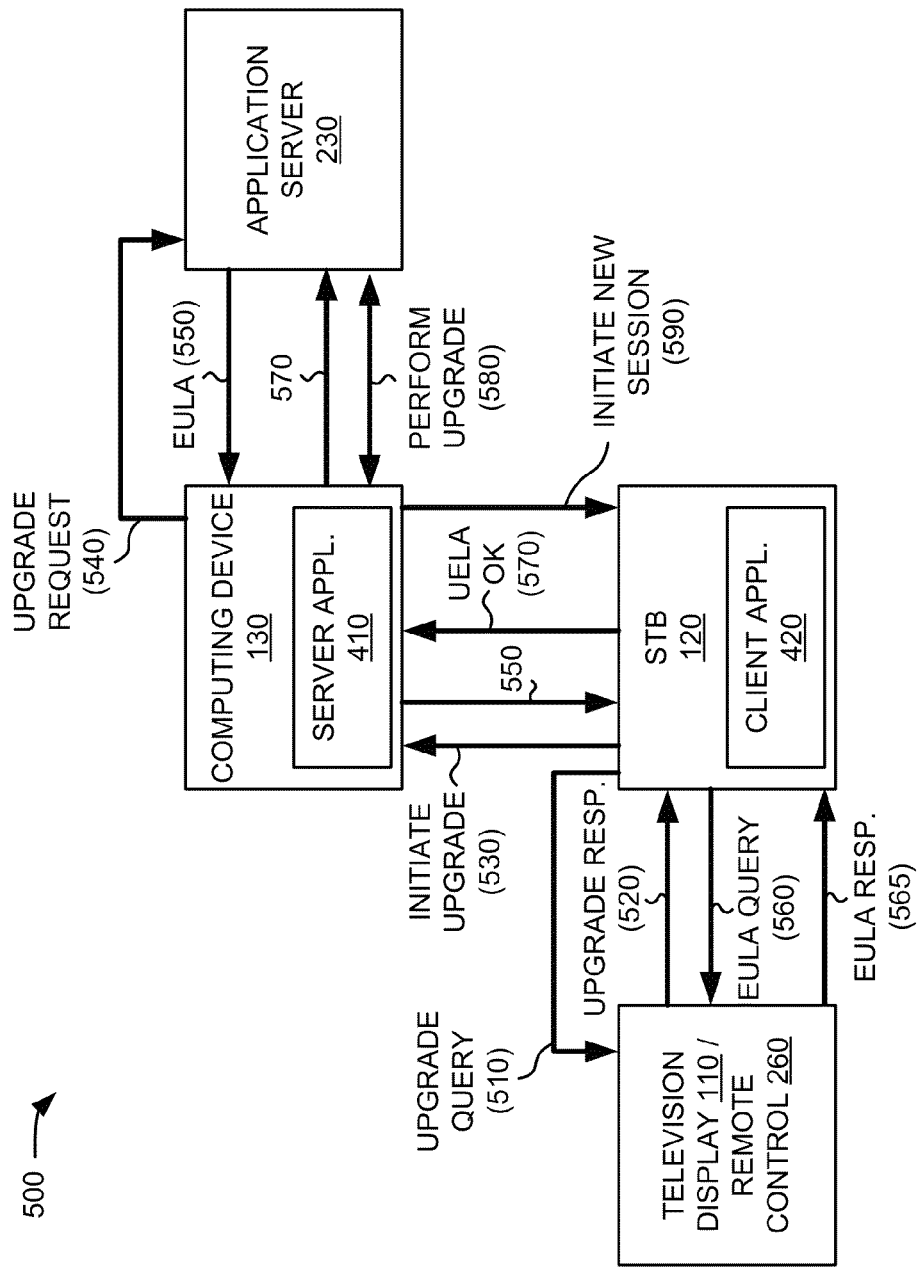
FIG. 5 is a block diagram illustrating additional exemplary communications between devices in another portion of the network of FIG. 2.

FIG. 5 is a diagram of exemplary communications for a portion 500 of network 200. Communications in FIG. 5 may represent communications to initiate upgrades to server application 410 via client application 420. As shown in FIG. 5, network portion 500 may include television display 110/remote control 260, STB 120, computing device 130, and application server 230. Television display 110, STB 120, computing device 130, application server 230, and remote control 260 may include functionality described above in connection with, for example, FIGS. 1-4.

Figure 6:
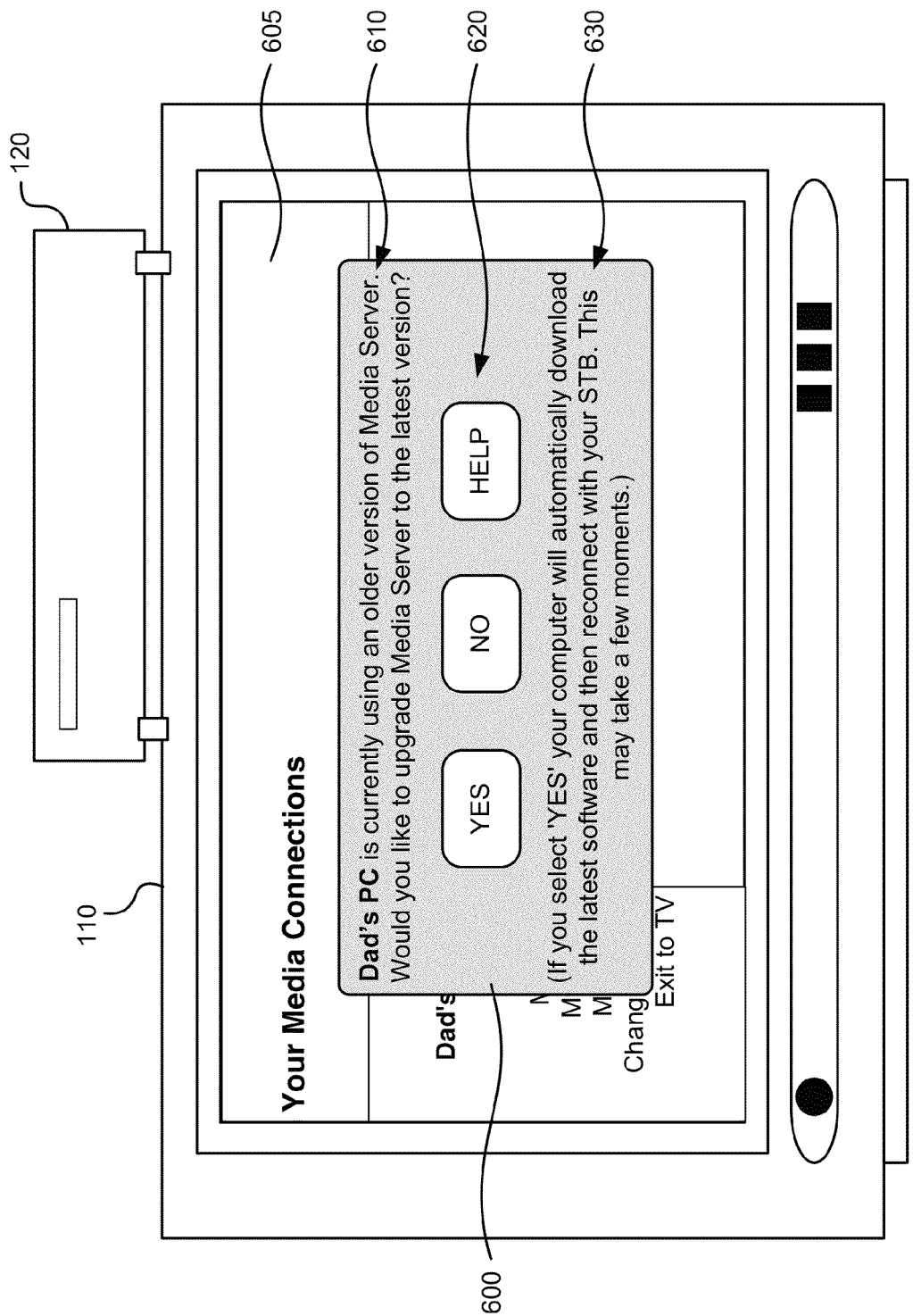
FIG. 6 is a diagram of an exemplary television user interface for presenting an interactive upgrade notification for a media server application.

Communications show in FIG. 5 may be initiated, for example, when client application 420 determines that server application 410 is eligible for a software upgrade. As shown in FIG. 5, STB 120 may provide an upgrade query 510 to a user of television 110 (e.g., a user viewing television display 110 to use a media manager service). FIG. 6 provides an example of an interactive upgrade notification 600, corresponding to upgrade query 510, that may be presented to the user.

As shown in FIG. 6, upgrade notification 600 may be presented as an overlay on a user interface 605 for client application 420. In other implementations, upgrade notification 600 may be provided in a messages or notifications section of user interface 405. Notification 600 may include an indication 610 that a particular server application 410 residing on a particular computing device 130 is eligible for a software upgrade, along with a solicitation to initiate an upgrade (e.g., "Would you like to upgrade . . . ?"). Indication 610 may identify the particular computing device 130 (e.g., "Dad's PC") to distinguish among multiple computing devices 130 that may be available in home network 210.

Upgrade notification 600 may also include a response section 620. Response section 620 may provide options that can be selected by the user (e.g., via remote control 260) to accept (e.g., "YES") or deny (e.g., "NO") the solicitation. Optionally, response section 620 may also include a help option to cause STB 120 to present additional information about the upgrade, such as a description of the upgrade process, particular software versions, features available in the newer software version, etc. In one implementation, upgrade notification 600 may also include a description section 630 to provide context of the user's selection.

Assume a user selects (e.g., via remote control 260) an option from response section 620 to accept the upgrade. Returning to FIG. 5, the user selection may be provided to STB 120/client application 420 as upgrade response 520. Based on upgrade response 520 (with the assumed positive response), client application 420 may signal server application 410 on computing device 130 to initiate a software upgrade, as indicated by reference number 530. Initiate upgrade signal 530 may satisfy requirements (e.g., provider network policy requirements) for obtaining express user authorization to initiate a software upgrade.

Server application 410 may receive initiate upgrade signal 530 and, in response, may provide an upgrade request 540 to application server 230. Upgrade request 540 may include, for example, any request in accordance with protocols for server application 410. In response to upgrade request 540, and prior to providing any software download, application server 230 may return an end-user license agreement (EULA) 550 to computing device 130. Alternatively (although not shown in FIG. 5), application server 230 may provide the EULA directly to client application 420 on STB 120. EULA 550 may include terms and conditions for use of the requested software upgrade and, in some implementation, must be accepted by a user before application server 230 can begin downloading requested software.

Figure 7:
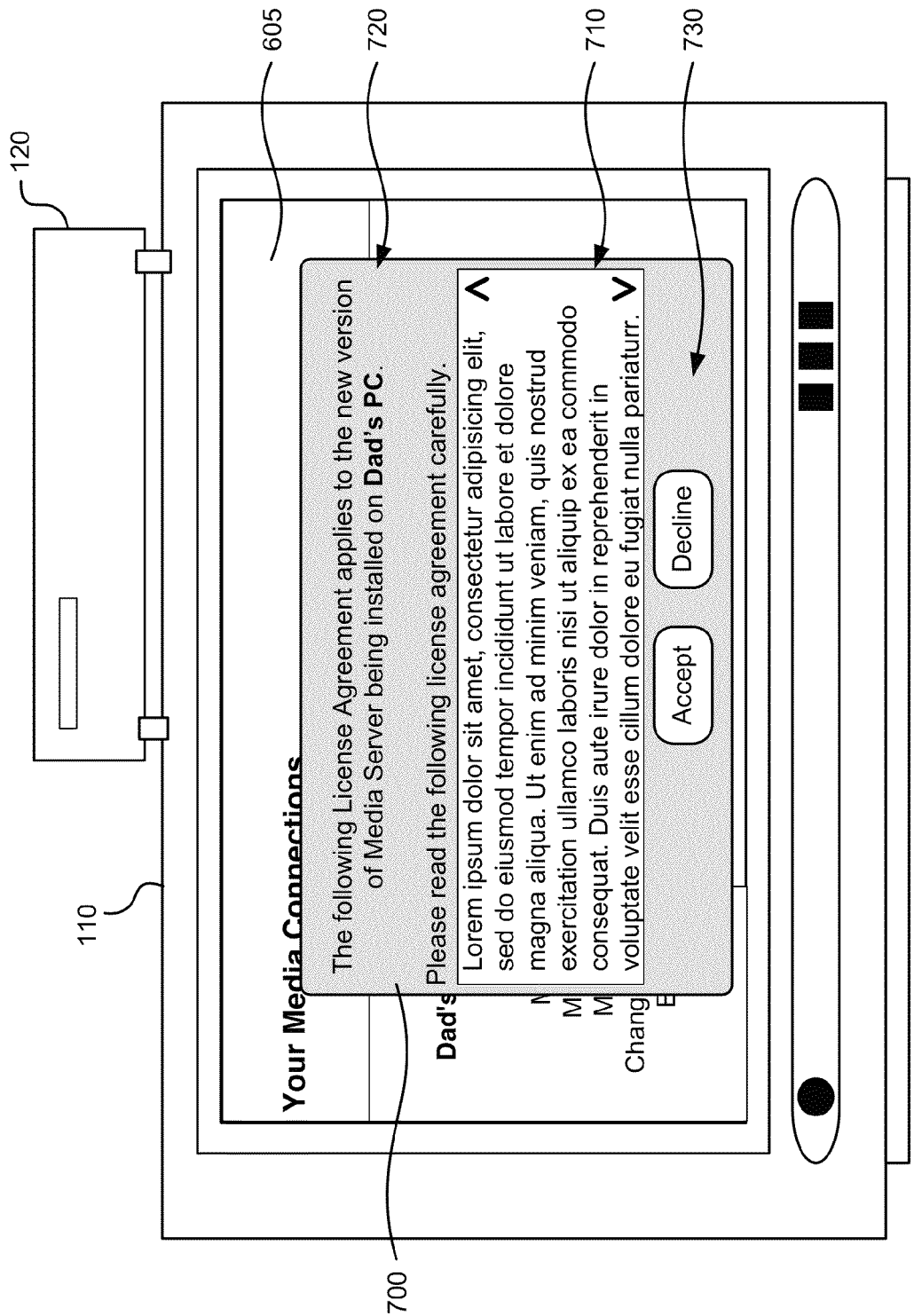
FIG. 7 is a diagram of an exemplary television user interface for presenting an end-user license agreement (EULA) for a media server application upgrade.

Server application 410 may forward EULA 550 to client application 420 for presentation to the user. Client application 420 may receive EULA 550 and may cause STB 120 to generate a EULA query 560 to present on television display 110. FIG. 7 provides an example of an interactive EULA display 700, corresponding to EULA query 560, that may be presented to the user.

As shown in FIG. 7, EULA display 700 may be presented as an overlay on a user interface 605 for client application 420. In other implementations, EULA display 700 may be provided in a messages or notifications section of user interface 405. EULA display 700 may include EULA text section 710 and an indication 720 relating the EULA text to a particular server application 410 residing on a particular computing device 130. EULA text section 710 may include text from EULA 550. Indication 720 may identify the particular computing device 130 (e.g., "Dad's PC") to distinguish among multiple computing devices 130 that may be available in home network 210. EULA display 700 may also in include a response section 730. Response section 730 may provide options that can be selected by the user (e.g., via remote control 260) to accept (e.g., "Accept") or decline (e.g., "Decline") the text in EULA text section 710.

Assume a user selects (e.g., via remote control 260) an option from response section 730 to accept the EULA. Returning to FIG. 5, the user selection from EULA display 700 may be provided to STB 120/client application 420 as EULA response 565. Based on EULA response 565 (with the assumed "accept" response), client application 420 may provide to server application 410 on computing device 130 a EULA OK signal 570 indicating that the user has accepted the EULA terms. Server application 410 may forward EULA OK signal 570 to application server 230. The EULA OK signal 570 may satisfy requirements (e.g., provider network policy requirements) for obtaining an express user agreement of the EULA.

Upon receiving EULA OK signal 570, application server 230 may begin communications with computing device 130/server application 410 to upgrade server application 410 to a newer version, as indicated by reference number 580. For example, server application 410 may terminate a session with client application 420 and the old version of server application 410 may be removed. Application server 230 may provide the new software version, which may be received/installed by computing device 130. After installation, computing device 130 may launch the upgraded server application 410, which, in turn, may initiate a new session with client application 420, as indicated by reference 590. The new session may permit a user to resume use of media transfer services between server application 410 and client application 420 with the upgraded software version.

Although FIG. 5 shows exemplary components of network portion 500, in other implementations, network portion 500 may include fewer components, different components, differently-arranged components, and/or additional components than depicted in FIG. 5. Alternatively, or additionally, one or more components of network portion 500 may perform one or more other tasks described as being performed by one or more other components of network portion 500.

FIG. 8 is a flow diagram of an exemplary process 800 for assisting a STB with device discovery according to an implementation described herein. In one implementation, process 800 may be performed by discovery server 220. In another implementation, some or all of process 800 may be performed by another device or group of devices, including or excluding discovery server 220. For example, application server 230 may perform one or more parts of process 800.

As shown in FIG. 8, process 800 may include receiving a server application's registration request that includes a local IP address and a port (block 810), and identifying a router (WAN) IP address, associated with the registration request (block 820). For example, upon installation/activation of server application 410, server application 410 may cause computing device 130 to send a registration request 411 toward discovery server 220 (via home router 250). Registration request 411 may include a local IP address where server application 410 is running and a port on which server application 410 is listening. Home router 250 may add header information or other indicators that will enable discovery server 220 to identify the router WAN IP address. Home router 250 may forward registration request 411 with router information, as indicated by reference number 415.

Process 800 may further include storing a discovery record for the server application (block 830), and receiving a client discovery request with a router (WAN) IP address (block 840). For example, as described above in connection with FIG. 4, discovery server 220 may receive the registration request with router information 415 and create/store a discovery record 421 with the router (WAN) IP address, the local IP address, and the port for server application 410. Upon activation of client application 420, client application 420 may cause STB 120 to generate a discovery request 440. Discovery request 440 may submit, to discovery server 220, a request for discovery records for computing device 130/server application(s) 410. In one implementation, home router 250 may add header information to discovery request 440 that will enable discovery server 220 to identify the WAN IP address of home router 250.

Process 800 may further include retrieving one or more discovery records matching the router (WAN) IP address (block 850), identifying a latest available version of the server application (block 860), and providing the one or more discovery records and an indication of the latest available version to the client (block 870). For example, as described above in connection with FIG. 4, discovery server 220 may query discovery database 225 for discovery record(s) 420 that match the router (WAN) IP address of home router 250. Discovery server 220 may identify a record with a matching router (WAN) IP address in discovery database 225 and retrieve 450 the corresponding record. Discovery server 220 may also retrieve software version number 430. Discovery server 220 may forward the retrieved record with the software version number, as response record 460, to client application 420.

Figure 9A:
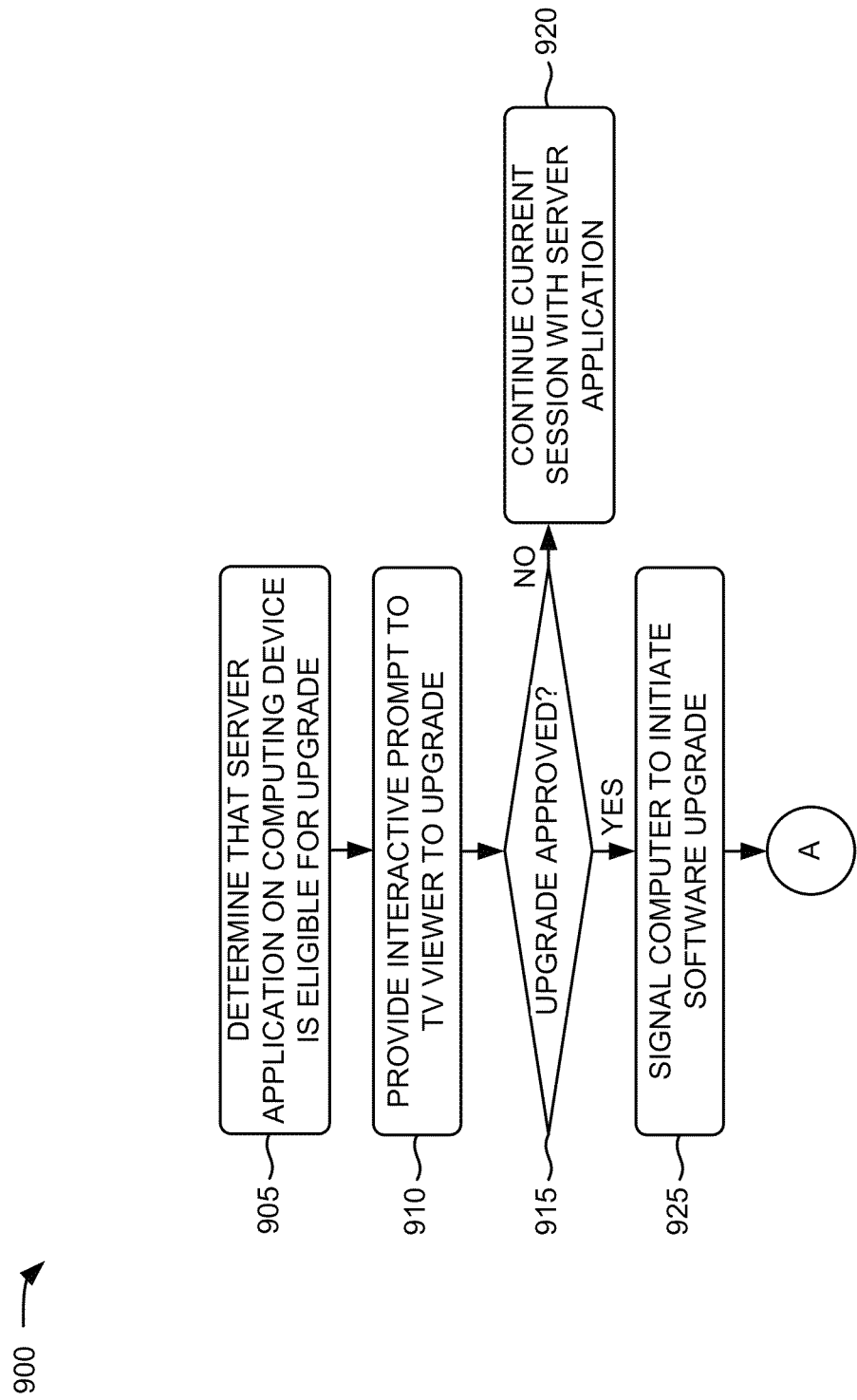
FIGS. 9A-10 are flow diagrams of an exemplary process for initiating, from an STB client, a media server application upgrade on a computing device, according to an implementation described herein.
Figure 9B:
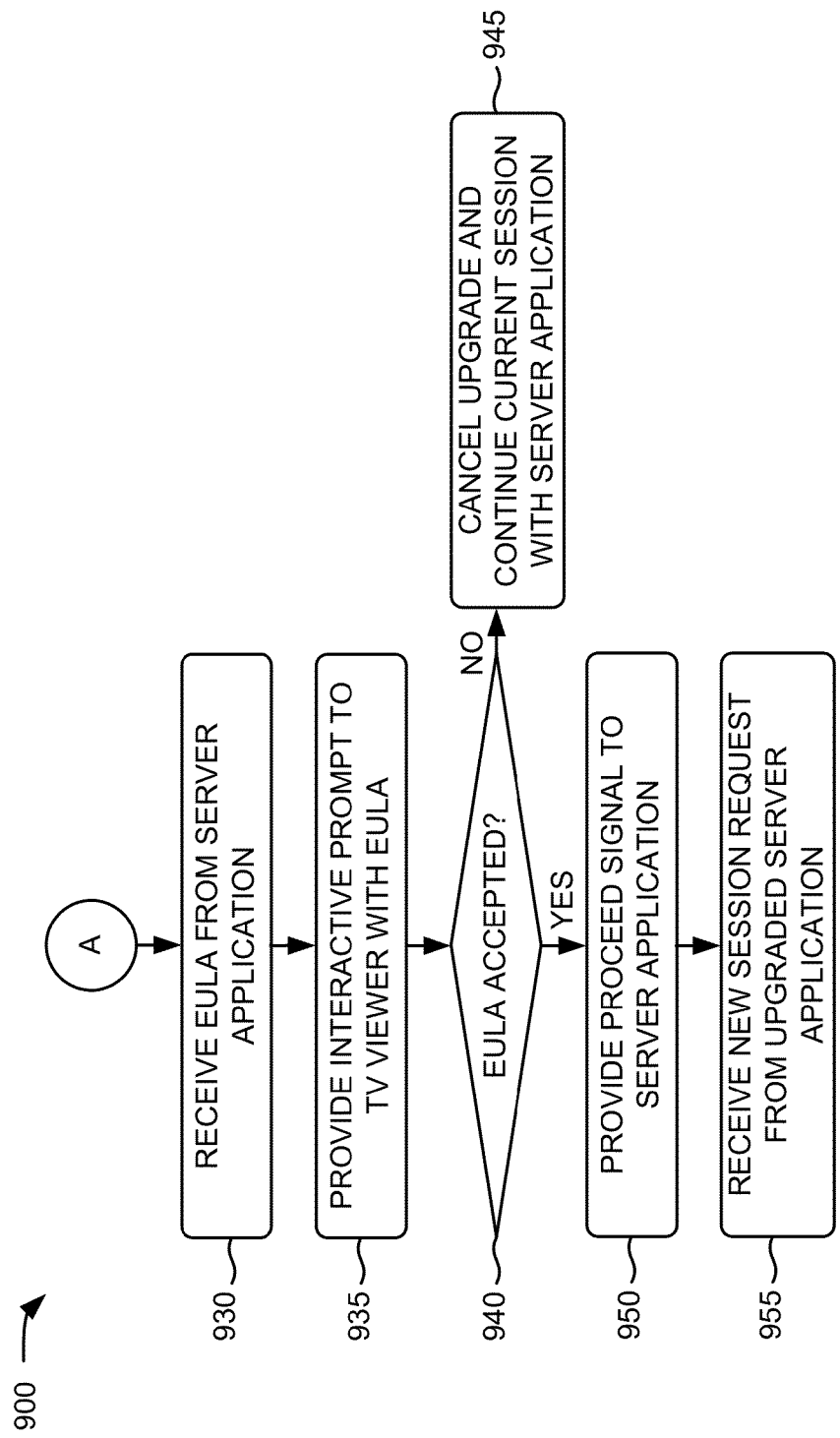
Figure 10:
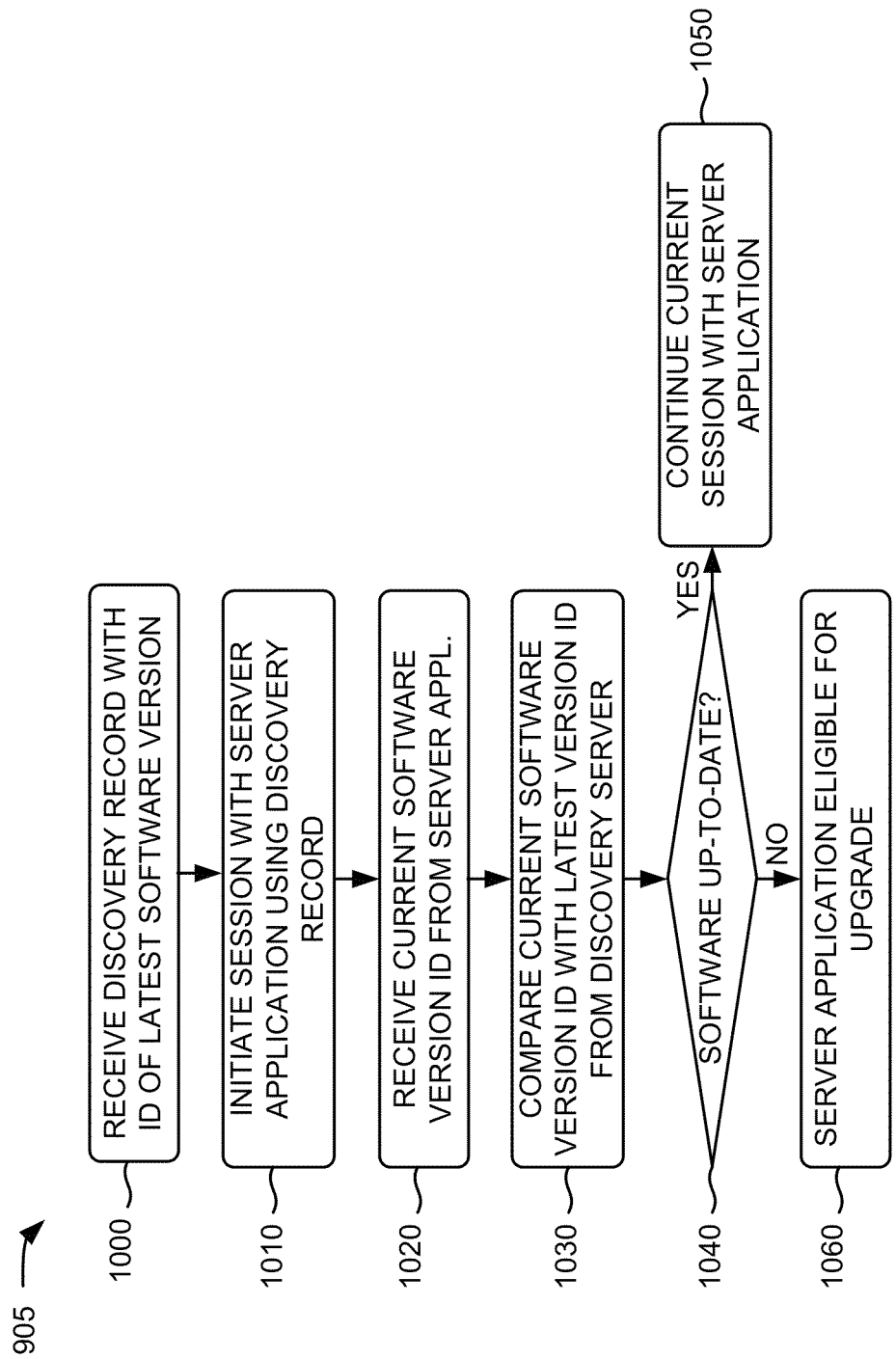

FIGS. 9A, 9B and 10 together provide a flow diagram of an exemplary process 900 for initiating, from an STB client, a server application upgrade on a computing device according to an implementation described herein. In one implementation, process 900 may be performed by STB 120. In another implementation, some or all of process 900 may be performed by another device or group of devices, including or excluding STB 120. For example, a device in provider network 215 may perform one or more parts of process 900.

As shown in FIG. 9, process 900 may include determining that a server application on a computing device is eligible for an upgrade (block 905). For example, client application 420 on STB 120 may compare a known latest software version identifier with a version identifier received from server application 410 to determine if the version of server application 410 on computing device 130 can be upgraded.

Process 900 may further include providing an interactive prompt to a television viewer to perform the upgrade (block 910), and receiving user feedback to the interactive prompt (block 915). For example, STB 120 may provide interactive upgrade notification 600 to a user of television 110 (e.g., a user viewing television display 110 to use a media manager service). The user may response to interactive upgrade notification 600 using remote control 260 to register a response to agree to or postpone the upgrade.

If the user feedback indicates the upgrade is not approved (block 915—NO), process 900 may include continuing a current session with the server application (block 920). For example, a user may select the "NO" option from response section 620 of interactive upgrade notification 600 to prevent the software upgrade. STB 120 may receive the user input and client application 420 may simply continue the current session with server application 410 (e.g., using the existing software version).

If the user feedback indicates the upgrade is approved (block 915—YES), process 900 may include signaling the computer to initiate the software upgrade (block 925), and receiving a EULA from the server application (block 930). For example, as described above in connection with FIG. 5, based on a positive (e.g., "YES") upgrade response 520, client application 420 may provide initiate upgrade signal 530 to server application 410 to initiate a software upgrade. Server application 410 may receive signal 530 and may provide an upgrade request 540 to application server 230. Application server 230 may return EULA 550 to computing device 130, which server application 410 may forward to client application 420.

Process 900 may further include providing an interactive prompt to a television viewer with the EULA (block 935), and receiving user feedback to the interactive prompt (block 940). For example, client application 420 may receive EULA 550 and may cause STB 120 to generate a EULA query 560 (e.g., interactive EULA display 700) to present on television display 110. The user may select to accept or decline the EULA terms and indicate a selection using remote control 260. The user selection from EULA display 700 may be provided to STB 120/client application 420 as EULA response 565.

If the user feedback indicates the EULA is not accepted (block 940—NO), process 900 may include canceling the upgrade and continuing the current session with the server application (block 945). For example, a user may select the "Decline" option from response section 730 of interactive EULA display 700. STB 120 may receive the user input and client application 420 may simply continue the current session with server application 410 (e.g., using the existing software version).

If the user feedback indicates the EULA is accepted (block 940—YES), process 900 may include providing a proceed signal to the media server (block 950), and receiving a new session request from the upgraded server application (block 960). For example, a user may select the "Accept" option from response section 730 of interactive EULA display 700. Client application 420 may provide to server application 410 on computing device 130 a EULA OK signal 570 indicating that the user has accepted the EULA terms. Server application 410 may forward EULA OK signal 570 and may proceed to upgrade server application 410 to a newer version, which may cause computing device 130 to terminate an existing session with client application 420. After installation of the software upgrade, computing device 130 may launch the upgraded server application 410, which, in turn, may initiate a new session with client application 420, as indicated by reference number 590.

In one implementation, process block 905 may include the process blocks indicated in FIG. 10. As shown in FIG. 10, process block 905 may include receiving a discovery record with an identifier of a latest version for the server application (block 1000), initiating a communication session with the server application using a discovery record (block 1010), receiving a current software version identifier from the application server (block 1020), and comparing the current software version identifier with the identifier of the latest version (block 1030). For example, as described in connection with FIG. 4, client application 420 may receive response record 460 with the latest software version information. Client application 420 may use information from response record 460 to initiate a session with computing device 130/server application 410, as indicated by reference number 470. Client application 420 may solicit from server application 410 a current version number (or other version identifier) for server application 410 as it currently resides on computing device 130.

Client application 420 may compare version number 480 to the software version number in response record 460 to determine if computing device 130 is eligible to receive a software upgrade for server application 410.

If the server application software is up-to-date (block 1040—YES), process block 905 may continue with session with the server application (block 1050). If the server application software is not up-to-date (block 1040—NO), the server application is deemed eligible for an upgrade (block 1060).

According to implementations described herein, a client application, executed on a set-top box with a local network, may detect that a media server application, executed on a computing device within the local network, is eligible for a software upgrade. The set-top box may provide, based on the detecting, an interactive prompt, on a separate television display, to request authorization for the software upgrade. The set-top box may receive user input, via a remote control, authorizing the software upgrade and may provide, to the media server application on the computing device, a signal for the media server application to initiate the software upgrade.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 8-10, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A system, comprising:
   a set-top box and a computing device within a local network, the computing device comprising:
   a first network interface to communicate with one or more remote systems;
   first one or more memories to store instructions and a media server application; and
   first one or more processors to execute instructions in the first one or more memories to send, to a remote network, a discovery record with a router wide- area network (WAN) IP address, wherein the discovery record includes a local IP address for the computing device and a listening port for the media server application; and the set-top box comprising:
- a second network interface to communicate with one or more remote systems;
- second one or more memories to store instructions; and
- second one or more processors to execute instructions in the second one or more memories to:
  - send, to the remote network and from the local network, a discovery request for the media server application within the local network,
  - receive, from the remote network, a response including the local IP address for the computing device and a port being used by the media server application,
  - initiate a communication session with the computing device based on the local IP address and the port,
  - receive, from the remote network, a first identifier for a latest software version of the media server application,
  - receive, from the media server application on the computing device in the local network, a second identifier for a currently-in-use software version of the media server application,
  - compare the first identifier and the second identifier to determine that the media server application is eligible for a software upgrade,
  - present, based on the detecting, an interactive prompt, on a display associated with the set-top box, to request authorization for the software upgrade of the media server application on the computing device,
  - receive user input, via a remote control associated with the set-top box, authorizing the software upgrade of the media server application on the computing device, and
  - provide, via the local network and to the media server application on the computing device, a signal to initiate the software upgrade from the remote network.

2. The system of claim 1, wherein the second one or more processors execute instructions in the one or more memories to:
- receive, from the computing device and via the local network, an end-user license agreement (EULA) for the software upgrade,
- provide, based on receiving the EULA, an interactive prompt on the display to solicit a user's acceptance or decline of the EULA,
- receive user input, via the remote control, accepting the EULA, and
- provide, to the computing device and via the local network, a signal to indicate that the user accepted the EULA.

3. The system of claim 2, wherein, when providing the interactive prompt to solicit the user's acceptance or decline of the EULA, the second one or more processors execute instructions in the one or more memories to:
- present the EULA in the interactive prompt on the display.

4. The system of claim 1, wherein the second one or more processors execute instructions in the one or more memories to:
- initiate the communication session with the computing device via the local network.

5. The system of claim 4, wherein the communication session is a TCP/IP session.

6. The system of claim 1, wherein the set-top box is not compliant with Digital Living Network Alliance (DLNA) standards.

7. The system of claim 6, wherein the second one or more processors execute instructions in the one or more memories to:
- receive, from the computing device and via the local network, an end-user license agreement (EULA) for the software upgrade,
- provide, based on receiving the EULA, an interactive prompt on the display to solicit a user's acceptance or decline of the EULA,
- receive user input, via the remote control, accepting the EULA, and
- provide, to the computing device and via the local network, a signal to indicate that the user accepted the EULA.

8. A method, comprising:
- sending, by a computing device in a local network and to a remote network, a discovery record with a first router wide-area network (WAN) IP address, wherein the discovery record includes a local IP address for the computing device and a listening port for a media server application residing on the computing device;
- sending, by a client application residing on a set-top box in the local network and to the remote network, a discovery request for the media server application;
- receiving, by the client application and from the remote network, a response including the local IP address for the computing device and a port being used by the media server application;
- initiating, by the client application, a communication session with the computing device based on the local IP address and the port;
- receiving, by the client application and from the remote network, a first identifier for a latest software version of the media server application;
- receiving, by the client application and from the media server application on the computing device, a second identifier for a currently-in-use software version;
- comparing, by the client application, the first identifier and the second identifier to determine that the media server application is eligible for a software upgrade;
- providing, by the client application and based on the detecting, an interactive prompt on a display to request authorization, from a user, for the software upgrade, wherein the display is different than the computing device;
- receiving, by the client application and from a remote control, user input authorizing the software upgrade on the computing device; and
- sending, by the client application via a local network and to the media server application on the computing device, a signal instructing the media server application to initiate the software upgrade of the media server application on the computing device with the remote network.

9. The method of claim 8, further comprising:
- receiving, from an upgraded media server application on the computing device, a request to initiate a new communication session.

10. The method of claim 8, further comprising:
- receiving, from the computing device, an end-user license agreement (EULA) for the software upgrade;
- providing, based on receiving the EULA, an interactive prompt on the display to solicit a user's acceptance of terms in the EULA;
- receiving user input, via the remote control, accepting the terms of the EULA; and providing, to the computing device, a signal to indicate that the user accepted the terms of the EULA.

11. The method of claim 10, wherein providing the interactive prompt to solicit the user's acceptance of the terms of the EULA further comprises:
presenting the terms of the EULA in the interactive prompt on the display.

12. The method of claim 8, further comprising:
initiating, by the client application on the set-top box, an Internet Protocol (IP) session with the media server application on the computing device.

13. The method of claim 8, further comprising:
presenting, by the set-top box and on the display, media content from the computing device.

14. The method of claim 8, wherein the client application residing on the set-top box is not compliant with Digital Living Network Alliance (DLNA) standards.

15. A method, comprising:
receiving, by a network device in a provider network and from a media server application residing on a computing device within a local network, a discovery record with a first router wide-area network (WAN) IP address, wherein the discovery record includes a local IP address for the computing device and a listening port for the media server application;
receiving, by the network device and from a set-top box that is different than the computing device and that is within the local network, a discovery request for the media server application on the computing device within the local network, wherein the discovery request includes a second router WAN IP address;
identifying, by the network device, that the first router WAN IP address matches the second router WAN IP address;
retrieving, by the network device, the discovery record, for the media server application on the computing device, when the first router WAN IP address matches the second router WAN IP address for the discovery request;
obtaining, by the network device, an identifier for a latest available version of the media server application; and
sending, to the set-top box, the discovery record with the identifier for the latest available version of the media server application.

16. The method of claim 15, wherein the discovery record provides information to enable a client application residing on the set-top box to initiate a TCP/IP session with the media server application.

17. The method of claim 15, wherein the set-top box is not compliant with Digital Living Network Alliance (DLNA) standards.

18. The method of claim 15, further comprising:
storing, by the network device, the discovery record for the media server application, wherein the discovery record includes the first router WAN IP address, the local IP address, and the port.

19. The method of claim 18, wherein storing the discovery record for the media server application, comprises:
storing the discovery record in a database of multiple other discovery records, wherein at least some of the other discovery records include different WAN IP addresses.

* * * * *